US011215079B2

(12) United States Patent
Huber et al.

(10) Patent No.: US 11,215,079 B2
(45) Date of Patent: Jan. 4, 2022

(54) TURBOMACHINE AND METHOD FOR DISASSEMBLING SUCH A TURBOMACHINE

(71) Applicant: ANSALDO ENERGIA SWITZERLAND AG, Baden (CH)

(72) Inventors: Tobias Christoph Huber, Herrischried (DE); Gerard Froidevaux, Kleindöttingen (CH); Daniel Seng, Busslingen (CH); Ivan Rozman, Nussbaumen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 476 days.

(21) Appl. No.: 14/662,381

(22) Filed: Mar. 19, 2015

(65) Prior Publication Data

US 2015/0267561 A1 Sep. 24, 2015

(30) Foreign Application Priority Data

Mar. 20, 2014 (EP) .................................... 14160803

(51) Int. Cl.
*F01D 25/24* (2006.01)
*F01D 25/26* (2006.01)
(Continued)

(52) U.S. Cl.
CPC ........... *F01D 25/243* (2013.01); *F01D 25/26* (2013.01); *F05D 2230/51* (2013.01);
(Continued)

(58) Field of Classification Search
CPC ...... F16B 5/0275; F16B 35/041; F01D 25/24; F01D 25/243; F01D 25/26
(Continued)

(56) References Cited

U.S. PATENT DOCUMENTS

| | | | | |
|---|---|---|---|---|
| 1,873,743 A * | 8/1932 | Doran | F01D 25/26 | 415/136 |
| 2,457,073 A * | 12/1948 | Stearns | F01D 25/243 | 138/159 |

(Continued)

FOREIGN PATENT DOCUMENTS

| | | |
|---|---|---|
| CN | 101611218 A | 12/2009 |
| CN | 101960100 A | 1/2011 |

(Continued)

OTHER PUBLICATIONS

Machine Translation of WO 2006103152 [retrieved on Jan. 11, 2017]. Retrieved from: Espacenet.*

(Continued)

*Primary Examiner* — J. Todd Newton
*Assistant Examiner* — Eric J Zamora Alvarez
(74) *Attorney, Agent, or Firm* — Buchanan Ingersoll & Rooney PC

(57) ABSTRACT

A turbine includes an outer casing and an inner casing surrounded by said outer casing. The outer casing and inner casing are coaxially arranged with respect to a machine axis. The outer casing and inner casing are each divided in a split plane into an upper part and a lower part. The upper and lower parts are connected with each other in said split plane by means of a flanged connection. The disassembly process is improved by the flanged connection of the upper and lower part of the inner casing comprising a plurality of bolts, which extend each through through holes in respective flanges of said flanged connection of the inner casing, protrude from said through holes at both ends with a threaded section, and are tightened by means of nuts screwed on said threaded sections at both ends of said bolt.

6 Claims, 2 Drawing Sheets

(51) Int. Cl.

| | |
|---|---|
| ***F01D 25/28*** | (2006.01) |
| ***F16B 35/04*** | (2006.01) |
| ***F16B 35/06*** | (2006.01) |

(52) U.S. Cl.
CPC ...... *F05D 2230/70* (2013.01); *F05D 2230/72* (2013.01); *F05D 2260/31* (2013.01); *Y10T 29/49229* (2015.01)

(58) Field of Classification Search
USPC ............................ 411/389; 415/213.1, 214.1
See application file for complete search history.

(56) References Cited

U.S. PATENT DOCUMENTS

| | | | | |
|---|---|---|---|---|
| 3,009,176 A * | 11/1961 | Knocke | B23P 19/08 | 470/4 |
| 3,493,212 A * | 2/1970 | Scalzo | F01D 25/26 | 415/127 |
| 3,628,884 A * | 12/1971 | Mierley, Sr. | F01D 25/26 | 415/213.1 |
| 7,037,065 B2 * | 5/2006 | Reigl | F01D 25/243 | 285/368 |
| 7,617,602 B2 * | 11/2009 | Dupin | F01D 25/265 | 29/402.03 |
| 8,276,273 B2 * | 10/2012 | Shigemoto | F01D 25/26 | 29/402.03 |
| 8,777,566 B2 | 7/2014 | Chieco et al. | | |
| 9,239,073 B2 * | 1/2016 | Taneichi | F16B 39/282 | |
| 2006/0104742 A1 * | 5/2006 | Fleming | F16B 5/0275 | 411/389 |
| 2011/0085904 A1 * | 4/2011 | Gossmann | F01D 25/243 | 415/214.1 |
| 2012/0093639 A1 | 4/2012 | Ballard, Jr. et al. | | |

FOREIGN PATENT DOCUMENTS

| | | | |
|---|---|---|---|
| CN | 102444437 | A | 5/2012 |
| EP | 1 052 377 | A2 | 11/2000 |
| EP | 2 213 846 | A1 | 8/2010 |
| GB | 1 211 313 | A | 11/1970 |
| GB | 1 244 289 | A | 8/1971 |
| WO | 2006/103152 | A1 | 10/2006 |

OTHER PUBLICATIONS

First Office Action dated Jul. 27, 2017, by the State Intellectual Property Office of the People's Republic of China in corresponding Chinese Patent Application No. 201510123602.0 (14 pages).
Examination Report dated Dec. 20, 2017, by the Patent Office of the Cooperation Council for the Arab States of the Gulf in corresponding GCC Application No. GC 2015-29075 (4 pages).
Office Action (Second Office Action) dated Apr. 3, 2018, by the State Intellectual Property Office (SIPO) of the People's Republic of China in corresponding Chinese Patent Application No. 201510123602.0, and an English Translation of the Office Action. (13 pages).
Examination Report dated Jul. 29, 2018, by the Patent Office of the Cooperation Council for the Arab States of the Gulf in corresponding GCC Application No. GC 2015-29075 (4 pages).

* cited by examiner

TURBOMACHINE AND METHOD FOR DISASSEMBLING SUCH A TURBOMACHINE

CROSS-REFERENCE TO RELATED APPLICATIONS

This application claims priority to European application 14160803.4 filed Mar. 20, 2014, the contents of which are hereby incorporated in its entirety.

TECHNICAL FIELD

The present invention relates to the technology of turbomachines in the form of turbines, especially gas turbines, or compressors. It refers to a turbomachine according to the preamble of claim 1.

It further refers to a method for disassembling such a turbomachine.

BACKGROUND

In a gas turbine, a steam turbine or a compressor, maintenance of parts is accomplished regularly or as necessary. Such turbomachines usually comprise an outer casing and an inner casing, which are arranged coaxially with regard to the machine axis or axis of rotation of the rotor of the machine. The inner casing is used for mounting a plurality of vanes, which influence the flow of the working fluid through the turbomachine.

The outer casing as well as the inner casing are usually of a two-piece construction divided into upper and lower parts in a split plane. To remove the lower part of the inner casing, various methods have been proposed. One of these methods is disclosed in FIG. 4 of document WO 2006103152 A1, which is reproduced in FIG. 1 of the present application.

As shown in FIG. 1(*a*), a gas turbine 10 comprises in a coaxial arrangement a central rotor 13 surrounded by a split inner casing 12 with an upper part 12*a* and a lower part 12*b*, both being connected in split plane 15 by means of a flanged connection, and both bearing a plurality of vanes 14. The inner casing 12 is surrounded by an outer casing 11 with an upper part 11*a* and a lower part 11*b*, both being connected in split plane 15 by means of a flanged connection.

The known disassembling process has the following steps (FIGS. 1(*b*) to 1(*e*): After the upper part 11*a* of outer casing 11 has been removed, upper part 12*a* of inner casing 12 is pulled out. Next, to the lower part 12*b* of inner casing 12 left in lower part 11*b* of outer casing 11 a guide ring 17 is mounted as a dummy in place of upper part 12*a* of inner casing 12 (FIG. 1(*b*)).

Then, lower part 12*b* and guide ring 17 are turned by 180° around the machine axis (FIG. 1(*c*)→1(*d*)). The turning is supported by special supporting means 16. In this state, since lower part 12*b* of inner casing 12 is now in a position similar to the original position of upper part 12*a*, i.e. above and outside lower part 11*b* of outer casing 11, lower part 12*b* of inner casing 12 can easily be pulled out (FIG. 1(*e*)).

A similar method is disclosed in document EP 1 052 377 A2.

However, the methods described above possess a problem:

For roll out of the inner casing's lower part with rotor installed a guide ring needs to be installed on the split plane of the inner casing lower part. The inner casing, respectively the guide ring is radially supported during complete 360° rotation by radial supporting means, which are installed in the outer housing's lower half. After rotation by 180°, the guide ring needs to be disconnected from the inner casing lower part, which is now in the upper position. Therefore the connecting bolts between guide ring and inner casing lower part need to be untightened.

Because of the tool handling and accessibility, untightening the lower half of outer casing is not possible.

Document EP 2 213 846 A1 proposes to use special connection plates and connecting bolts mounted between guide ring and lower part of the inner casing to achieve a smooth and safe removal of the inner casing's lower part. The main disadvantage of this solution is the need of special tools and an increase in the complexity of the disassembly procedure.

SUMMARY

It is an object of the present invention to provide a turbomachine design which avoids the disadvantages of known designs with regard to disassembly, and at the same time improves the stability of the casing structure during operation of the turbomachine.

It is another object of the invention to disclose a method for disassembling such a turbomachine.

These and other objects are obtained by a turbomachine according to claim 1 and a method according to claim 5.

The turbomachine according to the invention, especially a gas turbine, comprises an outer casing and an inner casing surrounded by said outer casing, whereby said outer casing and inner casing are coaxially arranged with respect to a machine axis, whereby said outer casing and inner casing are each divided in a split plane into an upper part and a lower part, and whereby said upper and lower parts are connected with each other in said split plane by means of a flanged connection.

It is characterized in that the flanged connection of the upper and lower part of said inner casing comprises a plurality of bolts, which extend each through through holes in respective flanges of said flanged connection of said inner casing, protrude from said through holes at both ends with a threaded section, and are tightened by means of nuts screwed on said threaded sections at both ends of said bolt.

According to an embodiment of the inventive turbomachine washers are provided between each nut and the respective flange.

According to another embodiment of the inventive turbomachine said bolts are designed as waisted shank bolts.

According to just another embodiment of the inventive turbomachine said bolts are provided with screw heads at their ends.

The inventive method for disassembling a turbomachine according to the invention comprises the steps of:

a) demounting the upper part of the outer housing;
b) untightening the bolts of the flange connection of the inner casing at their upper part ends by unscrewing the respective nuts;
c) removing the upper part of the inner casing;
d) mounting a guide ring on the lower part of the inner casing to replace the upper part of the inner casing;
e) tightening the bolts of the flange connection of the inner casing at their upper part ends;
f) rotating the assembly of the lower part of the inner casing and the guide ring by 180° around the machine axis;
g) untightening the bolts of the flange connection of the inner casing at their lower part ends by unscrewing the respective nuts; and
h) removing the lower part of the inner casing.

BRIEF DESCRIPTION OF THE DRAWINGS

The present invention is now to be explained more closely by means of different embodiments and with reference to the attached drawings.

DETAILED DESCRIPTION

Figure 1:
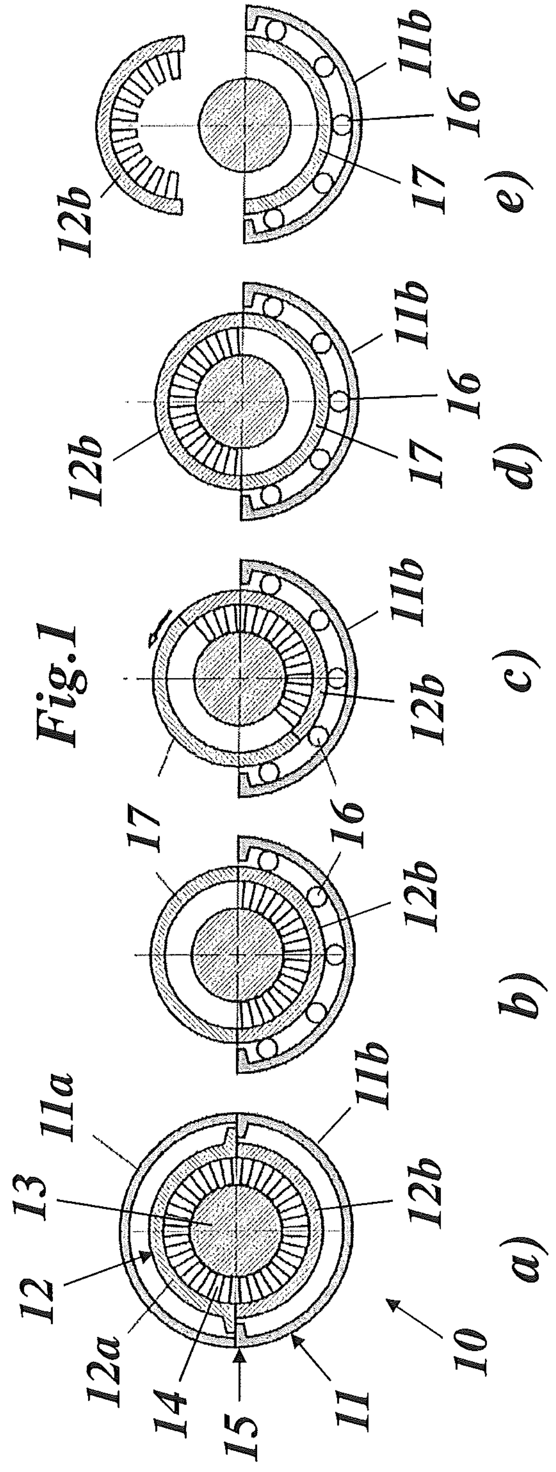
FIG. 1 shows a series of steps during a well-known process of disassembling a gas turbine with split inner and outer casings.
Figure 3:
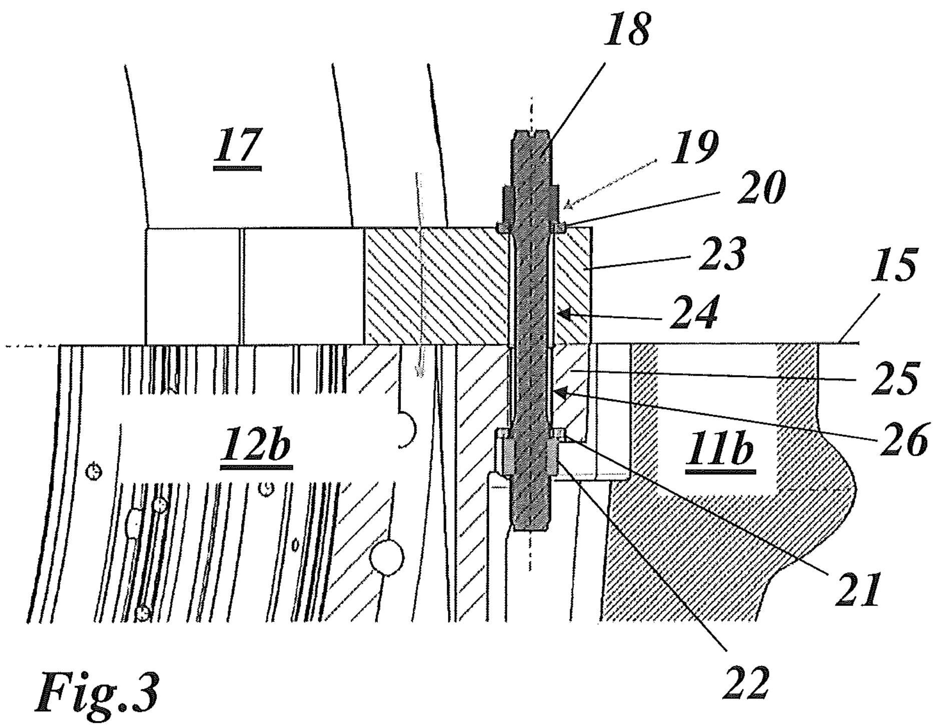
FIG. 3 shows the flange connection between the lower part of the inner casing and a mounted guide ring, which is used for the disassembling process according to FIG. 1, according to an embodiment of the invention.

FIG. 3 shows in a cross section the flange connection according to an embodiment of the invention, between the lower part 12*b* of the inner casing 12 and mounted guide ring 17, which flange connection is used for the disassembling process according to FIG. 1. Guide ring 17 has a flange 23 with a through hole 24, which is similar to the flange of the already removed upper part 12*a* of inner casing 12. Lower part 12*b* of inner casing 12 has a flange 25 with a through hole 26. The thickness of flange 25 can be and is reduced as there is no need to provide a threaded hole for fastening a bolt.

The flange connection between lower part 12*b* of inner casing 12 and guide ring 17 comprises a plurality of bolts 18, which extend each through through holes 24 in flange 23, and through holes 26 in flange 25. The bolts 18, which are designed as waisted shank bolts, as shown in FIG. 2, protrude from said through holes 24 and 26 at both ends with a threaded section 18*b* and 18*d*, and are tightened by means of nuts 19 and 22 screwed on said threaded sections 18*b* and 18*d* at both ends of said bolts 18.

Especially, washers 20 and 21 are provided between each nut 19 and 22 and the respective flange 23 and 25.

Figure 2:
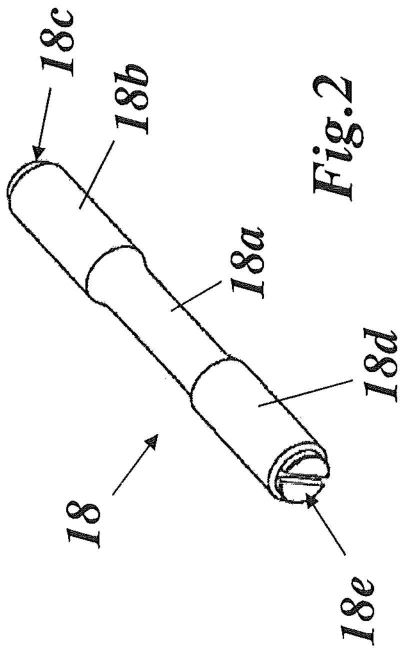
FIG. 2 shows in a perspective view a bolt for the flange connection of the inner casing according to an embodiment of the invention.

According to FIG. 2, bolts 18 are designed as waisted shank bolts with a waisted shank 18*a* in the middle and threaded sections 18*b* and 18*d* at both ends. Screw heads 18*c* and 18*e* may be provide in order to rotationally fix the bolt during untightening action.

Figure 4:
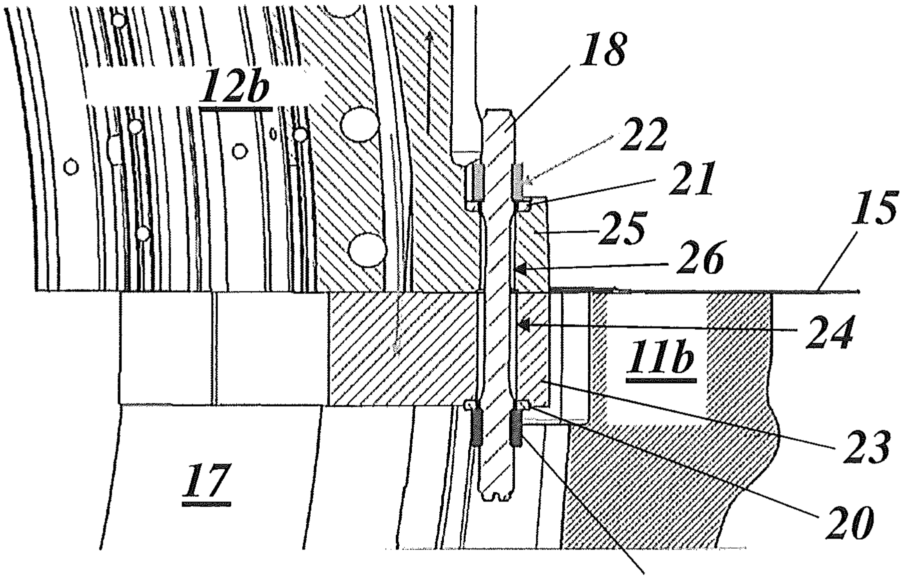
FIG. 4 shows the configuration of FIG. 3 after a rotation by 180° of the inner casing part around the machine axis.

When the arrangement of lower part 12*b* of inner casing 12 and guide ring 17 has been rotated by 180°, as shown in FIG. 4, upper nut 22 can easily be unscrewed and lower part 12*b* can be removed without using special tools.

The invention thus uses waisted shank bolts with threads and nuts on both ends to improve the disassembling process of the turbine.

The use of waisted shank bolts is advantageous for the corresponding flange design of the casings, which allows slimmer flanges, thus ensuring less ovalisation of inner casings during engine operation. The existing flange design with a thread inside one of the flange halves, on the other hand, requires a thick flange design in order to ensure a required clamping length.

Compared to the solution disclosed in document EP 2 213 846 A1, no special tooling is required.

The invention claimed is:

1. A turbomachine configured to include an inner casing mounted to an outer casing when fully assembled, wherein in a state of disassembly the turbomachine comprising:

said inner casing having an upper part and a lower part with a first flanged connection including a first through hole, the upper part and lower part of the inner casing bearing a plurality of vanes;

a guide ring having a second flanged connection with a second through hole, wherein the first flanged connection of said inner casing is connected to the second flanged connection of the guide ring;

a plurality of bolts extending each through the first and second through holes in said first and second flanged connections respectively, wherein each bolt has threaded sections that protrude from the first and second flanged connections on each end and a shank that fully extends through said through holes such that the threaded sections protrude from said through holes, wherein said bolts are provided with screw heads at each end for rotationally fixing said bolts during disassembly; and a pair of nuts secure each bolt to the first and second flanged connections via the threaded sections, wherein each nut in combination with a respective screw head provides means for disassembling the first and second flange connections, such that a rotationally fixed screw head allows untightening of at least one nut of the pair of nuts.

2. The turbomachine according to claim 1, further comprising washers disposed between each nut and the first and second flanged connections.

3. The turbomachine according to claim 2, wherein said bolts are designed as waisted shank bolts.

4. A method for disassembling a turbomachine including an inner casing having an upper part and a lower part divided in a split plane with a first flanged connection including a first through hole, the upper part and lower part of the inner casing bearing a plurality of vanes; a guide ring having a second flanged connection with a second through hole, wherein the first flanged connection of said inner casing is connected to the second flanged connection of the guide ring; a plurality of bolts extending each through the first and second through holes in said first and second flanged connections respectively, wherein each bolt has threaded sections that protrude from the first and second flanged connections on each end and a shank that fully extends through said through holes such that the threaded sections protrude from said through holes, wherein said bolts are provided with screw heads at each end for rotationally fixing said bolts during disassembly; and a pair of nuts secure each bolt to the first and second flanged connections via the threaded sections, wherein each nut in combination with a respective screw head provides means for disassembling the first and second flanged connections, such that a rotationally fixed screw head allows untightening of at least one nut of the pair of nuts, wherein when fully assembled an outer casing and said inner casing are coaxially arranged with respect to a machine axis, said outer casing is divided in the split plane into an upper part and a lower part, the method comprising:

demounting the upper part of the outer housing;

untightening the bolts of the first flanged connection of the inner casing at respective upper part ends by unscrewing respective nuts;

removing the upper part of the inner casing;

mounting the guide ring on the lower part of the inner casing to replace the upper part of the inner casing;

tightening the bolts of the first flanged connection of the inner casing at upper part ends to connect the second flanged connection of the guide ring to the lower part of the inner casing;

rotating an assembly of the lower part of the inner casing and the guide ring by 180° around the machine axis;

untightening the bolts of the first flanged connection of the inner casing at lower part ends by rotationally fixing each bolt via a respective screw head and unscrewing the respective nuts; and removing the lower part of the inner casing.

5. The turbomachine according to claim 1, wherein the first flanged connection of the inner casing is thicker than the second flanged connection of the guide ring.

6. The turbomachine according to claim 2, wherein the washers are disposed in a recess of the second flanged connection.

* * * * *